United States Patent [19]
Fillmore et al.

[11] Patent Number: 4,929,691
[45] Date of Patent: May 29, 1990

[54] LIQUID SILICONE RESIN COMPOSITIONS

[75] Inventors: Danielle M. Fillmore, Midland, County, Mich.; John G. Price, South Glamorgan, United Kingdom; Terence J. Swihart, Bay County, Mich.

[73] Assignee: Dow Corning Corporation, Midland, Mich.

[21] Appl. No.: 329,911

[22] Filed: Mar. 28, 1989

[51] Int. Cl.$^5$ .................................. C08F 283/00
[52] U.S. Cl. ...................... 525/477; 528/23; 556/462; 556/467; 556/469
[58] Field of Search .................. 528/23; 556/462, 467, 556/469; 525/477

[56] References Cited

U.S. PATENT DOCUMENTS

| | | | |
|---|---|---|---|
| 3,624,030 | 11/1971 | Pruvost et al. | 260/46.5 |
| 3,846,358 | 11/1974 | Roedel | 260/18 S |
| 4,113,665 | 9/1978 | Law et al. | 260/37 SB |
| 4,160,858 | 7/1979 | Roedel | 528/14 |
| 4,508,887 | 4/1985 | Kohl | 528/21 |
| 4,780,338 | 10/1988 | Saad et al. | 427/387 |

FOREIGN PATENT DOCUMENTS 2345923  9/1978  Fed. Rep. of Germany .

*Primary Examiner*—Melvyn I. Marquis
*Attorney, Agent, or Firm*—Alexander Weitz

[57] ABSTRACT

Solventless liquid silicone resin compositions are prepared by first reacting a mixture of (A) a polydimethylsiloxane and (B) a methyltrialkoxysilane in the presence of (C) an equilibrating amount of a perfluoroalkane sulfonic acid; hydrolyzing the reaction product formed with sufficient water to provide from about 0.48 to about 0.81 mole of residual alkoxy functionality per 100 parts by weight of said liquid silicone resin; and neutralizing the acid catalyst. Alternatively, the above components can be similtaneously reacted and then neutralized to form the resins of the present invention. The liquid silicone resins are storage stable, have low viscosities and can be cured to form heat-resistant protective coatings on substrates.

24 Claims, No Drawings

LIQUID SILICONE RESIN COMPOSITIONS

BACKGROUND OF THE INVENTION

The present invention relates to a liquid silicone resin composition. More particularly, the present invention relates to a solventless silicone resin which is prepared by partially hydrolyzing a mixture of a polydimethylsiloxane and a methyltrialkoxysilane, using a perfluoroalkane sulfonic acid as an equilibrating catalyst.

Silicone resins having trifunctional siloxy units and difunctional siloxy units are well known in the art and have been used extensively in the formulation of paints, varnishes, molding compounds and encapsulating compositions. Typically, these resins contain residual hydroxyl functionality, and occasionally residual alkoxy functionality, which may be condensed by means of heat and/or catalysis in order to cure the resins. Resins of this type are generally utilized in the form of solutions in organic solvents since they are often solids, or, at best, very viscous liquids at ordinary temperatures.

Thus, for example, U.S. Pat. No. 3,846,358 to Roedel discloses a process for producing a solid silicone resin by a complex sequence comprising partially hydrolyzing and alkoxylating an organohalosiloxane mixture with an alcohol and water, adding more alcohol, removing the acid formed by distillation, adjusting the acidity of the intermediate, adding additional water and alcohol and finally adjusting the solids content.

In U.S. Pat. No. 4,160,858, Roedel discloses a similar process for producing a solventless silicone resin having a viscosity of 200 to 5,000 cP at 25° C. wherein an alkali metal hydroxide is employed to reduce the acidity, and excess alcohol and water are stripped off in a final step.

Silicone resins may also be prepared directly from alkoxysilanes and polysiloxanes, as shown in U.S. Pat. No. 4,113,665 to Law et al. which teaches binder compositions for chemically resistant coatings. These binder resins are formed by reacting a trialkoxysilane with an aliphatic polyol and/or a silicone intermediate having hydroxyl or alkoxy terminal groups and a molecular weight of about 500 to 2,000 in the presence of an aqueous acidic solution.

Solventless silicone coating compositions are disclosed by Saad et al. in U.S. Pat. No. 4,780,338. In this invention, a silicone resin containing hydroxy, alkoxy or acyloxy functionality is blended with a diorganopolysiloxane fluid having functional groups which react with the alkoxy or acyloxy groups of the silicone resin and a condensation catalyst to cure the composition.

The use of various acids and bases as catalysts in the polymerization of silanol-terminated siloxanes is known in the art. In this regard, perfluoroalkane sulfonic acids, among others, have been utilized to promote the condensation of silanol-functional siloxanes to form high molecular weight fluids, gums and copolymers. In U.S. Pat. No. 4,508,887, Kohl discloses a method for preparing a polyorganosiloxane by reacting an inert medium mixture of at least one hydroxyl-containing organosiloxane in the presence of a catalytically effective amount of a catalyst consisting essentially of an amine salt of an acid and an unreacted acid selected from fluorinated alkanesulfonic acids or sulfuric acid.

Such acids have also found utility as catalysts during the partial hydrolysis of chlorosilane mixtures. German Laid Open publication DT No. 2,345,923 A1 to Bayer AG discloses chlorine-functional fluids and resins prepared by the partial hydrolysis of various chlorosilanes in the presence of perfluoroalkane sulfonic acids.

SUMMARY OF THE INVENTION

None of the above recited references teaches the preparation of stable, low viscosity, alkoxy-functional, 100% reactive silicone resins prepared according to the method of the present invention. Moreover, it has been discovered that the resins prepared according to the methods of the present invention may be modified with both traditional phenyl-containing silanol-functional solid resins as well as with polydimethylsiloxane fluids, the latter addition imparting increased slip to the cured resin.

Additionally, the resins prepared according to the method of the present invention rely on methyltrialkoxysilanes as starting materials. These methyltrialkoxysilanes can be readily obtained in purified form by distillation and the resulting resins are therefore relatively free of the residual chlorine contamination generally found in resins prepared from chlorosilanes. This often translates into reduced corrosion of metal surfaces coated with the resins and can be a particularly significant advantage in electronic applications.

The present invention therefore relates to a liquid silicone resin composition prepared by a process comprising:

(I) reacting a mixture consisting essentially of
(A) a polydimethylsiloxane,
(B) a methyltrialkoxysilane having the formula MeSi(OR)$_3$, wherein Me denotes a methyl radical and R is an alkyl radical having from 1 to 3 carbon atoms, and
(C) an equilibrating amount of an acid catalyst having the formula $$R'SO_3H$$

wherein R' is a perfluoroalkyl group having 1 to 10 carbon atoms, the molar ratio of said methyltrialkoxysilane (B) to said polydimethylsiloxane (A) being between about 1:1 and about 10:1;

(II) hydrolyzing the reaction product formed in step (I) with sufficient water to provide from about 0.48 to about 0.81 moles of residual alkoxy functionality per 100 parts by weight of said liquid silicone resin; and (III) neutralizing said acid catalyst (C).

The present invention further relates to a liquid resin composition prepared by a process comprising reacting the above mentioned components (A), (B) and (C) in the presence of a sufficient quantity of water of hydrolysis to provide from about 0.48 to 0.81 moles of residual alkoxy functionality per 100 parts by weight of said liquid silicone resin, and neutralizing the acid catalyst (C).

The present invention still further relates to the above described processes used to make the liquid silicone resin compositions.

DETAILED DESCRIPTION OF THE INVENTION

The polydimethylsiloxane (A) of the liquid silicone resin composition may be a linear polydimethylsiloxane. The selection of terminal groups for the polydimethylsiloxane is not being critical for the purpose of the present invention provided that an inert terminal group, such as trimethylsilyl, is not employed when the degree of polymerization of the polydimethylsiloxane is less than about 200. Thus, generic examples of suitable terminal groups include trialkylsilyl, alkoxydialkylsilyl, aryldialkylsilyl and hydroxydialkylsilyl groups. Specific terminal groups which may be used include Me₃Si—, MeO(Me₂)Si—, and HO(Me₂)Si—, wherein Me hereinafter denotes a methyl radical. Preferably, the end group is HO(Me₂)Si—.

Although component (A) is described as a polydimethylsiloxane, up to about 10 mole percent of siloxane units containing alkyl groups having 2 to 8 carbon atoms, phenyl groups or trifluoropropyl groups may be copolymerized with the dimethylsiloxane units to still be within the scope of this invention. Thus, copolymers of dimethylsiloxane units with phenylmethylsiloxane, methylhexylsiloxane or methyltrifluoropropylsiloxane units are specific examples of this component. It is preferred that when component (A) is a linear polydimethylsiloxane, that it be the dimethyl homopolymer.

Alternatively, and preferably, polydimethylsiloxane (A) is selected from at least one polydimethylcyclosiloxane having the formula $$(Me_2SiO)_x$$

wherein x is an integer between 3 and about 10, inclusive. For the purposes of the present invention, this preferred polydimethylsiloxane is a mixture of such cyclic siloxanes.

Component (B) of the present invention may be represented by the formula $$MeSi(OR)_3$$

wherein R is independently selected from alkyl radicals having from 1 to 3 carbon atoms. The preferred alkoxysilane is methyltrimethoxysilane.

The acid catalyst (C) may be represented by the general formula $$R'SO_3H$$

wherein R' is a perfluoroalkyl group having 1 to about 10 carbon atoms. Examples of suitable acid catalysts include perfluoromethane sulfonic acid, perfluoroethane sulfonic acid, perfluorohexane sulfonic acid, perfluorooctane sulfonic acid and perfluorodecane sulfonic acid. Component (C) is a strong acid capable of efficiently redistributing (i.e., equilibrating) siloxane bonds and is preferably perfluoromethane sulfonic acid. It has been observed that weaker acids, such as phosphoric or acetic acid, do not redistribute siloxane bonds and therefore do not produce the liquid silicone resins of the present invention.

All the components of the present invention are well known in the art and many are available commercially, so that no further description thereof is considered necessary.

In order to prepare the liquid silicone resin compositions of the present invention, from about 1 to about 10 moles of methyltrialkoxysilane (B) are first reacted with each mole of polydimethylsiloxane (A), the preferred molar ratio of component (B) to component (A) being about 2:1 to 7:1. The reaction is conducted under an inert atmosphere, such as nitrogen or argon, and is carried out in the presence of an equilibrating amount of catalyst (C). The term "equilibrating amount" as used herein denotes a sufficient amount of acid catalyst (C) to efficiently rearrange the siloxane bonds of reactants (A) and (B) so as to provide a substantially equilibrated product of reaction within 3-5 hours at temperatures between about 60° and 80° C. This amount may readily be determined by those skilled in the art by following the disappearance of the reactants using, e.g., gas chromatography, the acid being neutralized before each such determination. Thus, for example, when the catalyst is the preferred perfluoromethane sulfonic acid, it is employed at about 4 to 0.1 weight percent of the total of components (A) and (B). This amount of perfluoromethane sulfonic acid is sufficient to equilibrate the above mentioned components within about 4 hours at 70° C.

After equilibration of components (A) and (B) is attained, the reaction product is hydrolyzed with sufficient water to provide from about 0.48 to about 0.81 moles of residual alkoxy functionality per 100 parts by weight of liquid silicone resin. As should be apparent to the skilled artisan, the molar units and weight units must, of course, be consistent (e.g., gram-moles and grams, respectively). The basic reactions relied upon to calculate the amounts of water to be used in the hydrolysis step are: (i) the hydrolysis of methoxy groups on the above described equilibrated product to form silanol groups; and (ii) condensation of the silanol groups to form siloxane bonds. The net effect of these reactions, assuming the complete condensation of all silanol groups formed, requires the employment of one half mole of water for the hydrolysis of each mole of methoxy groups. Using this assumption, in combination with the above mentioned range of the ratio of the polydimethylsiloxane to the methyltrialkoxysilane, one skilled in the art can readily calculate the approximate amounts of the ingredients to be used in forming the liquid silicone resin compositions having from about 0.48 to about 0.81 moles of residual alkoxy functionality per 100 parts by weight of said liquid silicone resin. In practice, it has been found that the calculated (i.e., theoretical) methoxy content is generally within approximately 10 percent of the analytically determined value thereof. Preferably, the final liquid silicone resin according to the present invention has from about 0.55 to 0.71 moles of residual alkoxy functionality per 100 parts by weight of the resin, a value of about 0.68 being most preferred. The hydrolysis step may be carried out at temperatures between about 18° and 70° C., but preferably below the boiling point of the alcohol (e.g., MeOH) formed during the hydrolysis. This reaction should be carried out for at least one hour, whereupon the reactants are preferably heated to reflux and the alcohol formed is removed by distillation.

Finally, the acid catalyst is neutralized and the product stripped under vacuum to remove the remaining alcohol byproduct as well as other impurities. The product is then cooled and filtered.

In an alternate procedure, the compositions of the present invention ma be prepared by simultaneously equilibrating and hydrolyzing components (A) and (B) in the presence of acid catalyst (C). In this case, these three components are mixed with sufficient water of hydrolysis to, again, provide from about 0.48 and about 0.81 moles of residual alkoxy functionality per 100 parts by weight of said liquid silicone resin. The reaction conditions as well as proportions are the same as those described above. After the reaction is completed, the acid catalyst is again neutralized and the product stripped of impurities and filtered. The resins obtained by this procedure have been found to be essentially the same as those produced by the above described two-step process with respect to residual alkoxy functionality and molecular weight distribution.

As stated above, the actual amount of residual alkoxy left on the liquid silicone resin has been found to be critical in formulating the compositions of the present invention. For example, when less than about 0.48 moles of residual methoxy functionality per 100 parts by weight of the liquid silicone resin remains (corresponding to 15 weight percent methoxy). the compositions tend to gel upon storage under ordinary conditions. On the other hand, when the methoxy content is above about 0.81 moles of residual alkoxy functionality per 100 parts by weight of said liquid silicone resin (corresponding to 25 weight percent methoxy), the compositions have such a low molecular weight that they volatilize when subjected to the elevated temperatures often employed in curing such coatings on substrates. Additionally, cured films produced from such compositions are quite brittle and tend to crack easily during, or after, the cure cycle. Thus, even though other useful liquid resins may result from the substitution of different diorganopolysiloxanes, such as phenylmethylpolysiloxane and trifluoropropylpolysiloxane, for the instant polydimethylsiloxanes and the substitution of different alkoxysilanes, such as ethyltrimethoxysilane and phenyltrimethoxysilane, for the instant methyltrialkoxysilanes, these resin systems fall outside the scope of the present invention.

Because the compositions of the present invention contain residual alkoxy functionality, they may be cured by exposure to atmospheric moisture. The cure may be hastened by the addition of catalysts known in the art to promote the hydrolysis of the alkoxy groups and their subsequent condensation to form a three-dimensional siloxane network. Catalysts suitable for this purpose may be selected from the organo titanates, such as tetraisopropyl titanate and tetrabutyl titanate and organotin compounds, such as dibutyltin dilaurate, tin octoate and dibutyltin diacetate.

In addition to the above mentioned cure catalysts, the liquid silicone resin compositions may be blended with linear polydimethylsiloxanes of the type recited in the description of component (A). Addition of about 0.5 to 10 percent by weight of a polydimethylsiloxane having a viscosity of about 100 to 50,000 cS at 25° C. to the liquid silicone resins of the present invention results in compositions which exhibit reduced coefficients of friction (i.e., slip) and improved release when coated and cured on a substrate. The preferred polydimethylsiloxanes have a viscosity of about 1,000 to 20,000 cS at 25° C. and are preferably added to the liquid silicone resins of the present invention at a level of about 1 to 2 weight percent.

The liquid resin compositions may also be blended with organic solvent solutions of solid silicone resins comprising $MeSiO_{3/2}$, $Me_2SiO_{2/2}$, $PhSiO_{3/2}$ and $Ph_2SiO_{2/2}$ units, wherein Ph hereinafter denotes a phenyl group. Such resins generally contain residual hydroxyl groups and are well known in the art. They are typically prepared by hydrolyzing the respective chlorosilanes in an aromatic solvent. When such modified compositions are coated onto a substrate and the solvent is evaporated, the coatings are generally clear, depending on the particular solid resin selected and its proportion. Such blended coating compositions offer advantages over the solid silicone resins in that they require lower organic solvent contents and may be cured at reduced temperatures to provide films having improved hardness.

The compositions of the present invention may further be compounded with various fillers, such as titanium dioxide and aluminum flake, pigments, thermal stabilizers and flow agents.

The present invention also relates to the above described processes used to make the liquid silicone resin compositions based on polydimethylsiloxane (A) and methyltrialkoxysilane (B).

The liquid silicone resin compositions of the present invention find utility in the preparation of protective coatings for metal, glass and plastic substrates, high temperature paints, release coatings for bakeware, binders for masonry water repellant and as a paper or fabric saturant in the manufacture of automotive gaskets, inter alia.

EXAMPLES

The following examples are presented to further illustrate the compositions of the present invention, but are not to be construed as limiting the invention, which is delineated in the appended claims. All parts and percentages in the examples are on a weight basis unless indicated to the contrary and reported viscosities were obtained at 25° C.

Examples 1–15

A three-neck flask, equipped with a stirrer, condenser, nitrogen purge and thermometer was charged with 820 grams (6.02 moles) of methyltrimethoxysilane and 145 grams (1.96 moles) of a mixture of polycyclosiloxanes having the formula $(Me_2SiO)_x$, wherein Me hereinafter denotes a methyl radical and x had a value between 3 and 10. The mixture was stirred and 0.05% (based on total silicone) of trifluoromethane sulfonic acid (0.48 gram) was added, resulting in a bright yellow color. The catalyzed mixture was then slowly heated to 70° C. and stirred at this temperature for about 4 hours, whereupon the color faded somewhat to a "light straw" appearance. The contents of the flask were allowed to cool to 52° C. and 100 grams (5.56 moles) of deionized water were added over a period of about 2 minutes. The resulting exothermic reaction brought the temperature of the mixture to about 70° C. Stirring was continued for about another hour without further application of heat. Powdered calcium carbonate (0.9 grams) was added to neutralize the acid catalyst and a vacuum (about 30 mm Hg) was applied while slowly heating to about 120° C. This temperature was held for about 15 minutes to strip off volatiles. Upon cooling and filtering the residue, 658 grams of product was recovered (92.6% yield).

In a similar manner, the compositions shown in Table 1 were prepared. In addition to the actual amounts of the reactants used (reported in the second through the fourth columns), this table shows analytical results obtained on the products: molar methyl to dimethyl ratio (Me/Me$_2$); weight percent methoxy (OMe); and initial viscosity (cP).

TABLE 1

| | MeSi(OMe)$_3$ (grams) | (Me$_2$SiO)$_x$ (grams) | Water (grams) | Actual Mole Ratio Me/Me$_2$ | Actual Methoxy (Wt. %) | g-mol. / 100 g resin | Viscosity (cP @ 25° C.) |
|---|---|---|---|---|---|---|---|
| Example | | | | | | | |
| 1 | 820 | 145 | 100 | 2.87 | 21.1 | 0.681 | 30 |
| 2 | 760 | 50 | 100 | 6.80 | 21.1 | 0.681 | 42 |
| 3 | 820 | 50 | 115 | 8.20 | 20.5 | 0.661 | 55 |
| 4 | 760 | 145 | 115 | 2.70 | 15.1 | 0.487 | 70 |
| 5 | 820 | 240 | 115 | 1.80 | 16.1 | 0.519 | 35 |
| 6 | 760 | 240 | 100 | 1.70 | 17.4 | 0.561 | 40 |
| 7 | 700 | 145 | 100 | 2.60 | 17.4 | 0.561 | 50 |
| 8 | 760 | 145 | 115 | 2.30 | 15.0 | 0.484 | 70 |
| (Comparative) Example | | | | | | | |
| 9 | 760 | 145 | 115 | 2.75 | 14.5 | 0.468 | 90 |
| 10 | 760 | 240 | 130 | 1.61 | 9.1 | 0.296 | 340 |
| 11 | 700 | 50 | 115 | 6.97 | 14.5 | 0.468 | 200 |
| 12 | 760 | 50 | 130 | 7.60 | 12.8 | 0.413 | 7,000 |
| 13 | 700 | 145 | 130 | 2.50 | 10.0 | 0.323 | 1,250 |
| 14 | 820 | 145 | 130 | 2.90 | 13.8 | 0.445 | 124 |
| 15 | 700 | 240 | 115 | 1.60 | 11.0 | 0.355 | 120 |

The liquid resin compositions of the present invention were stable when stored in sealed containers at room temperature for more than a year whereas the comparative compositions, prepared by the same methods, tended to gel on standing, as indicated in Table 2.

TABLE 2

| (Comparative) Example | Gel Time |
|---|---|
| 9 | Less than 12 months |
| 10 | 30 Days |
| 11 | 56 Days |
| 12 | 12 Days |
| 13 | 30 Days |
| 14 | 9 Months |
| 15 | 9 Months |

(Comparative) Example 16

A procedure similar to that used to prepare Example 1 was followed in the preparation of a composition having a theoretical Me/Me$_2$ mole ratio of 3:1 and a theoretical methoxy functionality of 34.2% (i.e., 154 grams of polycyclosiloxanes, 846 grams of methyltrimethoxysilane and 68.5 grams water). After the stripping step, the amount of liquid resin obtained was only 52% of the theoretical value.

The above liquid resin was coated onto a steel panel and a cure at 150° C. for 30 minutes was attempted, whereupon all the material on the panel volatilized, an indication of its low molecular weight.

Adding 10% of tetraisopropyl titanate (hereinafter TIPT) to the above liquid resin, coating this mixture onto a steel panel and curing at 150° C. for 30 minutes, resulted in a film which cracked profusely when the panel had cooled to room temperature, indicating the film's brittle nature.

Example 17

A procedure similar to that used to prepare (Comparison) Example 16 was followed wherein the theoretical values of the Me/Me$_2$ ratio and percent methoxy functionality were 2.95 and 19.3%, respectively. The yield of the liquid resin from this preparation was 73.7% while the actual values of Me/Me$_2$ and methoxy were 2.89 and 18.3%, respectively. The latter value corresponds to 0.590 moles methoxy/100 g resin.

The above liquid resin was catalyzed with 0.2% of TIPT, coated onto a steel panel and cured at 150° C. for 30 minutes. The coating was soft and easily scratched. After an additional 30 minutes at 150° C., the coating, which was between 0.4 and 1.0 mil thick, had a pencil hardness of F to 4H. The pencil hardness was determined by attempting to scratch the cured coating surface with a sharp pencil, the reported value being the designation of the hardest pencil which would not scratch the surface (ASTM Test Method D 3363).

Example 18

Portions of the liquid resin of Example 1 were mixed with the catalysts shown in Table 3, wherein TBT and DBTDA hereinafter denote tetra(n-butyl) titanate and dibutyltin diacetate, respectively. These catalyzed compositions were then flow-coated onto clean steel panels and, after being hung vertically at room temperature for 24 hours to dry, the coatings were cured at 200° F. for 30 minutes.

In addition to the determination of pencil hardness, these coatings were subjected to a slip test which provided an indication of their coefficient of friction. This test basically consisted of placing a gauze-covered weight (100 grams) on the coated panel and tilting the panel. The angle of incline (from the horizontal) at which this weight started to slide was designated as the "slip angle" and is also reported in Table 3.

TABLE 3

| Catalyst Employed | Catalyst Amount (%) | Coating Thickness (Mils) | Pencil Hardness | Slip Angle (Degrees) |
|---|---|---|---|---|
| TBT | 5 | 0.39 | F | 8 |
| TBT | 5 | 0.37 | F | 8 |
| TIPT | 2 | 0.37 | H | 8 |
| TIPT | 2 | 0.41 | H | 8 |
| DBTDA | 5 | 0.31 | 2B | 7 |
| DBTDA | 5 | 0.30 | 2B | 7 |

When zinc octoate and aluminum acetylacetonate were used as catalysts at a 2% level, the coatings did not cure under the above describe conditions

Example 19

A liquid resin similar to Example 1, having a Me/Me$_2$ ratio of 2.6 and a methoxy content of 20.4%, was used to prepare a paint having an equal weight of $TiO_2$ powder based on the resin solids content. Mica (325 mesh) was also added to this paint formulation at a level of about 32% based on the $TiO_2$ content. The mixing was accomplished with a laboratory mixer having Cowles blades (3600 r.p.m. for 25 minutes) to obtain a uniform dispersion. Portions of this filled system were catalyzed as shown in Table 4, below. These compositions were brushed onto steel panels and cured at 400° F. for 30 minutes. After being cured, the panels were aged in an air oven at 500° F. and pencil hardness values were determined at various times, as shown in Table 4.

TABLE 4

| Amount of TBT Catalyst Added (%) | Pencil Hardness After Aging at 500° F. | | | | |
|---|---|---|---|---|---|
| | Initial | 200 Hours | 500 Hours | 800 Hours | 1,000 Hours |
| None | B | HB | HB | HB | HB |
| 0.5 | 2B | HB | B | 4B | 2B |
| 1.0 | HB | 2B | 4B | 4B | 2B |

From the above table it is seen that the titanium dioxide-filled coatings of the present invention are resistant to thermal and oxidative degradation, particularly when no catalyst is added.

Example 20

Two parts of the above liquid resin of Example 19 were mixed with one part of E-30 flaked aluminum (Reynolds Metals Company, Richmond, Va.) on a mixing wheel for one hour. The coating composition containing the aluminum flake was filtered and sprayed onto steel panels, held at room temperature for 15 minutes and cured at 450° F. for 30 minutes. Initial pencil hardness of the film, which had a thickness of 0.96±0.27 mil, was F. After 24 hours aging at 1,000° F., the hardness increased to above 9H. The film survived 1,000 hours at 1,000° F. without flaking off the panel.

Example 21

A liquid resin similar to Example 1, having a Me/Me$_2$ ratio of 3.2 and a methoxy content of 22.9%, was thoroughly mixed with 1% of a trimethylsilyl endblocked linear polydimethylsiloxane having a viscosity of 12,500 cS. Portions of this composition were catalyzed with TBT, coated onto steel panels and cured, as indicated in Table 5, below.

TABLE 5

| Amount of TBT (%) | Cure Temp./ Cure Time | Film Thickness (Mil) | Pencil Hardness | Slip Angle (degrees) |
|---|---|---|---|---|
| 1 | 300° F./30 min. | 0.35 +/− 0.10 | 2B | 10 |
| 1 | 425° F./60 min. | 0.08 +/− 0.03 | 5H | 6 |
| 0.5 | 425° F./60 min. | 0.03 +/− 0.02 | 5H | 4 |

Example 22

A liquid resin similar to Example 1, having a Me/Me$_2$ ratio of 2.6 and a methoxy content of 20.4%, was mixed with 9% of a hydroxy-endblocked linear polydimethylsiloxane having a viscosity of about 70 cS and catalyzed with 0.2% DBTDA plus 0.2% TIPT. After this composition was coated onto a steel panel and cured at 300° F. for 50 minutes followed by 400° F. for 10 minutes, the resulting film had a thickness of 0.83±0.19 mil, a pencil hardness of F and a slip angle of 8 degrees. Although as much as 44% of the above mentioned hydroxy-endblocked polydimethylsiloxane could be blended with the liquid resin compositions of the present invention without haze formation (i.e., the mixtures were clear and stable), coatings having more than about 9% were considerably softer.

The above two examples illustrates the compatibility of polydimethylsiloxane fluids with the liquid resin compositions of the present invention and show the utility of the instant compositions in the formation of coatings having improved slip or release properties.

Example 23

A liquid resin similar to Example 1, having a Me/Me$_2$ ratio of 3.2 and a methoxy content of 22.9%, was mixed with equal weights of solutions of three different silicone resins comprising $MeSiO_{3/2}$, $Me_2SiO_{2/2}$, $PhSiO_{3/2}$ and $Ph_2SiO_{2/2}$ units, wherein Ph hereinafter denotes a phenyl group (Table 6). These resins were prepared by hydrolyzing the respective chlorosilanes in the indicated aromatic solvent and they had the molar compositions and weight percent of residual hydroxyl functionality shown in Table 6, below. These compositions were coated onto steel panels and cured at 400° F. for 35 minutes followed by 500° F. for 10 minutes.

TABLE 6

| Resin Composition (Mole Ratio) ($MeSiO_{3/2}$:$Me_2SiO_{2/2}$: $PhSiO_{3/2}$:$Ph_2SiO_{2/2}$) | Percent OH on Resin (as SiOH) | Coating Thickness (Mil) | Hardness | Slip Angle (Degrees) |
|---|---|---|---|---|
| 32:29:39:0[a] | 3 | 0.35 +/− 0.07 | 2H | 17 |
| 15:40:35:10[b] | 1 | 0.30 +/− 0.04 | B | >30 |
| 25:19:37:19[a] | 3 | 0.29 +/− 0.04 | H | 10 |

[a] Solution consisted essentially of 60% resin solids in toluene.
[b] Solution consisted essentially of 50% resin solids in xylene.

The above results illustrate the ease with which the compositions of the present invention may be blended with conventional phenyl-containing silicone resins to yield clear films, which films had good adhesion to the metal substrate.

Examples 24-25

A binder resin was prepared as described in Example 8 of U.S. Pat. No. 4,113,665 to Law et al. (Comparative Example 24). In this comparative example, 855 grams of methyltrimethoxysilane was reacted with 108 grams of a hydroxyl functional silicone intermediate of the type used by Law et al. This intermediatate is a 60% solids solution of a silanol-functional resin having $MeSiO_{3/2}$, $Me_2SiO_{2/2}$, $PhSiO_{3/2}$ and $Ph_2SiO_{2/2}$ units in a molar ratio of 25:20:35:20 having a hydroxyl content of about 3%. The methyltrimethoxysilane was hydrolyzed with 126 grams of 15% aqueous phosphoric acid, as stipulated in said patent example. Thus, the weight ratio of methyltrimethoxysilane to the silicone intermediate, on a solids basis, was about 13. No fillers were added to this binder composition.

A composition according to the present invention (Example 25) was prepared using the same weight ratio of methyltrimethoxysilane to the above described mixture of polycyclosiloxanes (i.e., a ratio of 13, as in the case of the above cited patent to Law et al.). This composition had a $Me/Me_2$ ratio of 7.1 and a methoxy content of 23%.

A comparison of the above two compositions is shown in Table 7, wherein analytical and cured film properties are reported.

TABLE 7

|  | (Comparative) Example 24 (Law et al. patent) | Example 25 (This Invention) |
|---|---|---|
| $Me/Me_2$ Ratio (Molar) | 37 | 7.1 |
| Methoxy (Wt. %) | 37 | 23 |
| No. Avg. Molecular Weigh (by g.p.c.) | 3,300 | 980 |
| Wt. Avg. Molecular Weigh (by g.p.c.) | 590,000 | 66,000 |
| Weight Loss (250° C./3 hours) | 11.7% | 38.2% |
| Viscosity (cS) | 3 | 9 |
| Closed Cup Flash Pt. | 46° F. | 194° F. |
| Film Properties (1% TBT catalyst added in each case) | | |
| Pencil Hardness | | |
| (Room Temp. Cure) | Softer than 6B | B |
| (Cure @ 300° F./30 min.) | Softer than 6B | 2H |
| Slip Angle (Degrees) | | |
| (Room Temp. Cure) | >35 | 10 |
| (Cure @ 300° F./30 min.) | >35 | 8 |

We claim:

1. A liquid silicone resin composition prepared by a process comprising:
   (I) reacting a mixture consisting essentially of
      (A) a polydimethylsiloxane,
      (B) a methyltrialkoxysilane having the formula $MeSi(OR)_3$, wherein Me denotes a methyl radical and R is an alkyl radical having from 1 to 3 carbon atoms, and
      (C) an equilibrating amount of an acid catalyst having the formula $R'SO_3H$ wherein R' is a perfluoroalkyl group having 1 to 10 carbon atoms, the molar ratio of said methyltrialkoxysilane (B) to said polydimethylsiloxane (A) being between about 1:1 and about 10:1;
   (II) hydrolyzing the reaction product formed in step (I) with sufficient water to provide from about 0.48 to about 0.81 mole of residual alkoxy functionality per 100 parts by weight of said liquid silicone resin; and
   (III) neutralizing said acid catalyst (C).

2. The composition according to claim 1, wherein R is a methyl radical.

3. The composition according to claim 2, wherein said acid catalyst is perfluoromethane sulfonic acid.

4. The composition according to claim 3, wherein polydimethylsiloxane (A) is at least one polydimethylcyclosiloxane having the formula $(Me_2SiO)_x$ in which x is an integer between 3 and about 10, inclusive.

5. The composition according to claim 4, wherein the ratio of said methyltrialkoxysilane (B) to said polydimethylsiloxane (A) is between 2:1 and 7:1.

6. The composition according to claim 5, wherein the residual alkoxy functionality is from about 0.55 to about 0.71 mole of methoxy groups per 100 parts by weight of said liquid silicone resin.

7. The composition according to claim 1, comprising the further addition of about 0.5 to 10 weight percent of a linear polydimethylsiloxane (E) having a viscosity of about 100 to 50,000 cS at 25° C.

8. The composition according to claim 7, wherein said linear polydimethylsiloxane (E) has a viscosity of about 1,000 to 20,000 cS at 25° C. and is employed at a level of about 1 to 2 weight percent.

9. The composition according to claim 1, comprising the further addition of a solid silicone resin containing siloxane units selected from the group consisting of $MeSiO_{3/2}$, $Me_2SiO_{2/2}$, $PhSiO_{3/2}$ and $Ph_2SiO_{2/2}$ units, wherein Me and Ph denote methyl and phenyl groups, respectively.

10. A liquid silicone resin composition prepared by a process comprising:
   (I) reacting a mixture consisting essentially of
      (A) a polydimethylsiloxane,
      (B) a methyltrialkoxysilane having the formula $MeSi(OR)_3$, wherein Me denotes a methyl radical and R is an alkyl radical having from 1 to 3 carbon atoms,
      (C) an equilibrating amount of an acid catalyst having the formula $R'SO_3H$ wherein R' is a perfluoroalkyl group having 1 to 10 carbon atoms, the molar ratio of said methyltrialkoxysilane (B) to said polydimethylsiloxane (A) being between about 1:1 and about 10:1, and
      (D) sufficient water of hydrolysis to provide from about 0.48 to about 0.81 mole of residual alkoxy functionality per 100 parts by weight of said liquid silicone resin; and
   (II) neutralizing said acid catalyst (C).

11. The composition according to claim 10, wherein R is a methyl radical.

12. The composition according to claim 11, wherein said acid catalyst is perfluoromethane sulfonic acid.

13. The composition according te claim 12, wherein polydimethylsiloxane (A) is at least one polydimethylcyclosiloxane having the formula $(Me_2SiO)_x$ in which x is an integer between 3 and about 10, inclusive.

14. The composition according to claim 13, wherein the ratio of said methyltrialkoxysilane (B) to said polydimethylsiloxane (A) is between 2:1 and 7:1.

15. The composition according to claim 14, wherein the residual alkoxy functionality is from about 0.55 to about 0.71 mole of methoxy groups per 100 parts by weight of said liquid silicone resin.

16. The composition according to claim 10, comprising the further addition of about 0.5 to 10 weight percent of a linear polydimethylsiloxane (E) having a viscosity of about 100 to 50,000 cS at 25° C.

17. The composition according to claim 16, wherein said polydimethylsiloxane (E) has a viscosity of about 1,000 to 20,000 cS at 25° C. and is employed at a level of about 1 to 2 weight percent.

18. The composition according to claim 10, comprising the further addition of a solid silicone resin containing siloxane units selected from the group consisting of $MeSiO_{3/2}$, $Me_2SiO_{2/2}$, $Ph_2SiO_{3/2}$ and $Ph_2SiO_{2/2}$ units, wherein Me and Ph denote methyl and phenyl groups, respectively.

19. A process for preparing a liquid silicone resin composition comprising:
(I) reacting a mixture consisting essentially of
  (A) a polydimethylsiloxane,
  (B) a methyltrialkoxysilane having the formula $MeSi(OR)_3$, wherein Me denotes a methyl radical and R is an alkyl radical having from 1 to 3 carbon atoms, and
  (C) an equilibrating amount of an acid catalyst having the formula $R'SO_3H$ wherein R' is a perfluoroalkyl group having 1 to 10 carbon atoms, the molar ratio of said methyltrialkoxysilane (B) to said polydimethylsiloxane (A) being between about 1:1 and about 10:1;
(II) hydrolyzing the reaction product formed in step (I) with sufficient water to provide from about 0.48 to about 0.81 mole of residual alkoxy functionality per 100 parts by weight of said liquid silicone resin; and
(III) neutralizing said acid catalyst (C).

20. The process according to claim 19, wherein R is a methyl radical and said acid catalyst is perfluoromethane sulfonic acid.

21. The process according to claim 20, wherein polydimethylsiloxane (A) is at least one polydimethylcyclosiloxane having the formula $(Me_2SiO)_x$ in which x is an integer between 3 and about 10, inclusive.

22. A process for preparing a liquid silicone resin composition comprising:
(I) reacting a mixture consisting essentially of
  (A) a polydimethylsiloxane,
  (B) a methyltrialkoxysilane having the formula $MeSi(OR)_3$, wherein Me denotes a methyl radical and R is an alkyl radical having from 1 to 3 carbon atoms,
  (C) an equilibrating amount of an acid catalyst having the formula $R'SO_3H$ wherein R' is a perfluoroalkyl group having 1 to 10 carbon atoms, the molar ratio of said methyltrialkoxysilane (B) to said polydimethylsiloxane (A) being between about 1:1 and about 10:1, and
  (D) sufficient water of hydrolysis to provide from about 0.48 to about 0.81 mole of residual alkoxy functionality per 100 parts by weight of said liquid silicone resin; and
(II) neutralizing said acid catalyst (C).

23. The process according to claim 22, wherein R is a methyl radical and said acid catalyst is perfluoromethane sulfonic acid.

24. The process according to claim 23, wherein polydimethylsiloxane (A) is at least one polydimethylcyclosiloxane having the formula $(Me_2SiO)_x$ in which x is an integer between 3 and about 10, inclusive.

* * * * *